(12) United States Patent
Paluri

(10) Patent No.: US 10,748,247 B2
(45) Date of Patent: Aug. 18, 2020

(54) COMPUTING HIGH-RESOLUTION DEPTH IMAGES USING MACHINE LEARNING TECHNIQUES

(71) Applicant: Facebook, Inc., Menlo Park, CA (US)

(72) Inventor: Balmanohar Paluri, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 219 days.

(21) Appl. No.: 15/854,680

(22) Filed: Dec. 26, 2017

(65) Prior Publication Data

US 2019/0197667 A1 Jun. 27, 2019

(51) Int. Cl.
| | | |
|---|---|---|
| *G06K 9/00* | (2006.01) | |
| *G06T 3/40* | (2006.01) | |
| *G06K 9/62* | (2006.01) | |
| *G06K 9/46* | (2006.01) | |
| *H04N 13/139* | (2018.01) | |
| *H04N 9/04* | (2006.01) | |
| *H04N 5/33* | (2006.01) | |

(52) U.S. Cl.
CPC .......... *G06T 3/4046* (2013.01); *G06K 9/4652* (2013.01); *G06K 9/6256* (2013.01); *G06T 3/4007* (2013.01); *H04N 5/33* (2013.01); *H04N 9/045* (2013.01); *H04N 13/139* (2018.05)

(58) Field of Classification Search
CPC ... G06T 3/4046; G06T 3/4007; H04N 13/139; G06K 9/4652; G06K 9/6256
USPC ........................................................ 382/154
See application file for complete search history.

(56) References Cited

U.S. PATENT DOCUMENTS

| | | | | |
|---|---|---|---|---|
| 9,996,771 | B2 * | 6/2018 | Clayton | ............. G06K 9/00805 |
| 10,643,106 | B2 * | 5/2020 | Clayton | ............. G06K 9/00369 |
| 2015/0015569 | A1 * | 1/2015 | Jung | ..................... G06T 15/005 |
| | | | | 345/419 |
| 2017/0236013 | A1 * | 8/2017 | Clayton | ................. G06N 5/046 |
| | | | | 382/104 |
| 2018/0260662 | A1 * | 9/2018 | Clayton | ............. G06K 9/00825 |
| 2019/0004533 | A1 * | 1/2019 | Huang | ................. G05D 1/0248 |

OTHER PUBLICATIONS

Zhou, Wentian, Xin Li, and Daryl Reynolds. "Guided deep network for depth map super-resolution: How much can color help?." 2017 IEEE International Conference on Acoustics, Speech and Signal Processing (ICASSP). IEEE, 2017. (Year: 2017).*
Diebel, J. et al., "An Application of Markov Random Fields to Range Sensing," *Neural Information Processing Systems Proceedings*, 2005, eight pages.

* cited by examiner

*Primary Examiner* — Jonathan S Lee
(74) *Attorney, Agent, or Firm* — Fenwick & West LLP

(57) ABSTRACT

A system trains a machine learning model to generate a high-resolution depth image. During a training phase, the system generates an accurate three dimensional reconstruction of a training scene such that the machine learning model is iteratively trained to minimize an error between the higher resolution depth image and the depth information in the accurate three dimensional reconstruction. During a real-time phase, the system applies the trained machine learning model to images captured from a scene of interest and generates a higher resolution depth image with higher accuracy. Thus, the higher resolution depth image can be subsequently used to solve computer vision problems.

20 Claims, 3 Drawing Sheets

COMPUTING HIGH-RESOLUTION DEPTH IMAGES USING MACHINE LEARNING TECHNIQUES

BACKGROUND

This disclosure generally relates to image processing, and more specifically to computing high-resolution depth images using a machine learning model trained with machine learning techniques on images of color information at high resolutions and corresponding images with depth information at relatively low resolutions.

Cameras capture images and videos of a scene using various sensors. As an example, a camera sensor, such as a color sensor, can be specifically configured to capture two-dimensional color information regarding the scene. Alternatively, a camera sensor, such as a depth sensor, can be configured to capture depth information regarding the scene. Depending on the camera configuration, camera sensors in a single camera may capture images at different resolutions. Specifically, conventional cameras employ depth sensors that capture an image with a resolution that is far below the resolution of an image captured by a color sensor. Constructing high-resolution depth images using existing methods by combining color images in high resolutions and corresponding depth images at relatively lower resolutions is problematic. However, higher resolution depth sensors are cost prohibitive, thereby precluding their inclusion in conventional cameras.

Instead of employing a high resolution depth sensor, conventional systems employ image processing techniques that upsample a depth image at a lower resolution to match the resolution of a corresponding color image. One example of a conventional image processing technique is pixel interpolation. As an example, interpolated pixels can be generated from two or more existing pixels. For example, if a first existing pixel has a first value and a second existing pixel has a different second value (i.e. a depth discontinuity), then the interpolated pixels between the first and second existing pixels may be assigned values that smooth the transition between the first existing pixel and the second existing pixel. Altogether, these conventional image processing techniques remain sub-optimal and fail to accurately upsample the depth image. Therefore, the subsequent processing of an upsampled depth image and corresponding color images also suffer due to the non-optimally upsampled depth images.

SUMMARY

Disclosed herein are systems and methods for computing a high-resolution depth image (i.e., an upsampled depth image) of an input image having depth information captured at a lower resolution using a trained depth prediction model, e.g., using the trained depth prediction model to upsample the depth information captured at the lower resolution. Generally, a system iteratively trains a machine learning model according to images captured from a training scene including both color images and depth images. The machine learning model can learn how to more effectively upsample a depth image that has depth information captured at a low resolution (e.g., a low resolution depth image) based on the captured color images. Therefore, when the trained machine learning model is applied to a low resolution depth image in real-time, the trained machine learning model outputs an upsampled depth image with a higher resolution than the low resolution depth image. In many scenarios, the upsampled depth image has a resolution that matches the resolution of the color images. Thus, the higher resolution depth image can be further used, along with the color images, in computer vision applications.

The system trains a machine learning model using training data that includes high resolution color information, low resolution depth information, and additional high resolution depth information. Specifically, the color information and low resolution depth information can serve as the inputs for training the machine learning model. The color information can be derived from high resolution color images captured by multiple color sensors of a system. Additionally, the low resolution depth information can be derived from low resolution depth images captured by a depth sensor of the system. In one embodiment, the color information and low resolution depth information are features extracted from the color images and low resolution depth images, respectively. The additional high resolution depth information of the training data can serve as the ground truth for training the machine learning model. In one embodiment, the high resolution depth information are features extracted from a three dimensional reconstruction of a scene that was generated using data captured by a scene mapping device of the system.

The system trains the machine learning model to minimize the discrepancy between extracted features of the upsampled depth image and the ground truth (i.e., the additional high resolution depth information). As an example, an error between the extracted features of the upsampled depth image and the additional high resolution depth information is backpropagated and the parameters of the machine learning model are tuned to reduce the backpropagated error. Therefore, as the machine learning model is trained over time, the machine learning model learns to generate a high resolution depth image from a corresponding low resolution depth image.

During a real-time phase, the system retrieves the appropriate trained machine learning model to generate an upsampled depth image. In some embodiments, the appropriate trained machine learning model is specifically trained for a scene domain that corresponds to a scene of interest. Therefore, features extracted from color images and depth images captured from the scene of interest are applied as inputs to the trained machine learning model, which generates and outputs a high resolution depth image that can be further used for image processing purposes.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Overall System Environment

Figure 1:
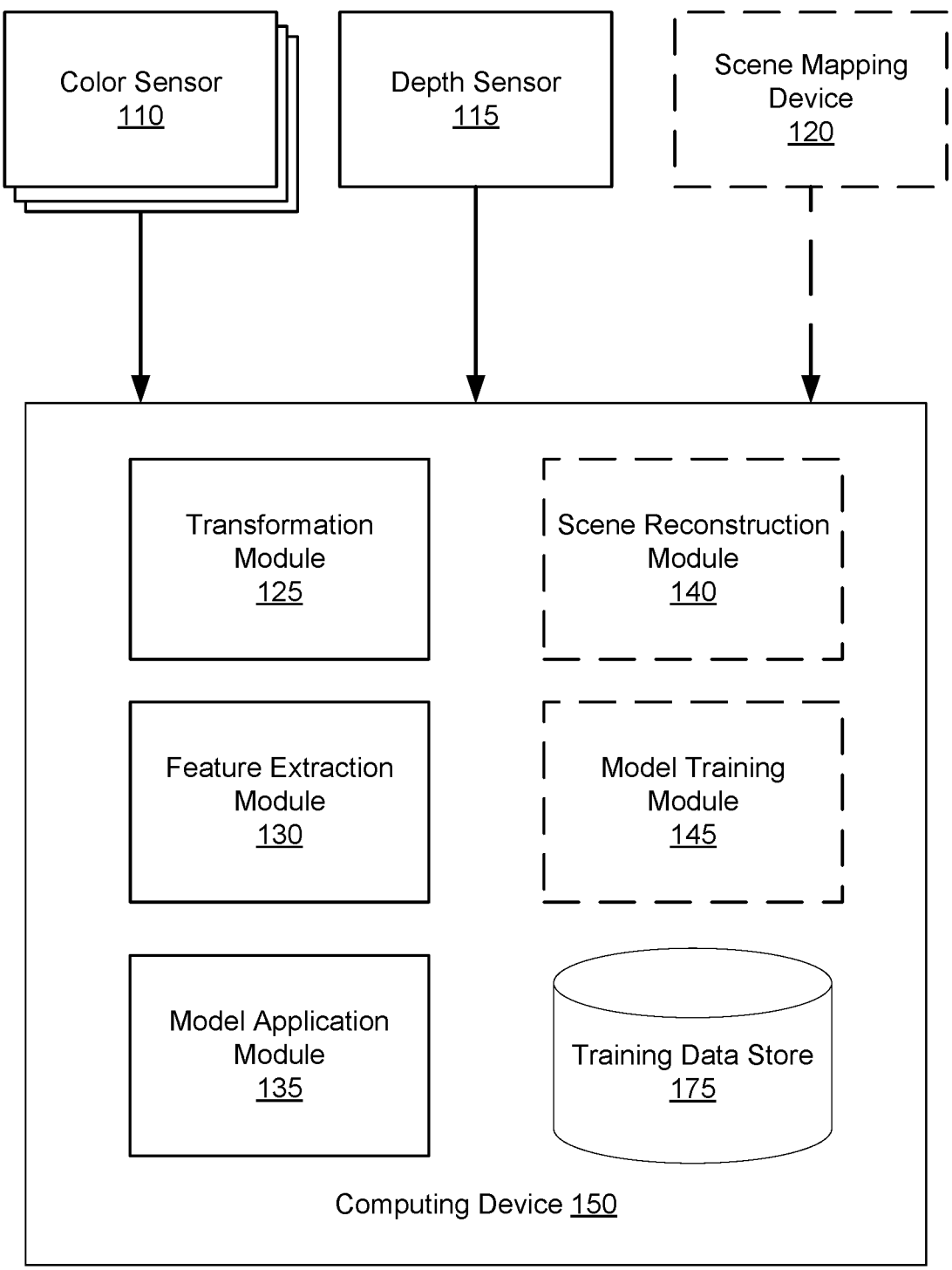
FIG. 1 is a system environment for generating an upsampled depth image, in accordance with an embodiment.

FIG. 1 is a system 100 for generating an upsampled depth image, in accordance with an embodiment. As depicted, the system 100 includes one or more color sensors 110, a depth sensor 115, a scene mapping device 120, and a computing device 150. Each of the components of the system 100 is hereafter described in reference to two phases: 1) a training phase and 2) a real-time phase. More specifically, the training phase refers to the training of one or more machine learning models based on training data captured by the color sensors 110, depth sensor 115, and scene mapping device 120. The machine learning model is trained to accurately generate a high resolution depth image. During the real-time phase, the trained machine learning model can be applied to a depth image with an initial resolution and subsequently generates an upsampled depth image with a resolution greater than the initial resolution.

In various embodiments, the components of the system 100, as depicted in FIG. 1, are embodied in different hardware. For example, the system 100 may include a first device (e.g., a cell phone or a camera mounted on a robotic device) that includes the color sensors 110, a depth sensor 115, and a computing device 150 that further includes a transformation module 125, feature extraction module 130, and model application module 135. The system 100 further may further include a second device that includes the components and modules depicted in dotted lines in FIG. 1. Specifically, the second device includes scene mapping device 120 and is further configured to perform the methods of the scene reconstruction module 140 and the model training module 145. In various embodiments, the first device and the second device communicate with one another through communication technologies such as Ethernet, 802.11, 3G, 4G, 802.16, Bluetooth, near field communication, or any other suitable communication technology. In these embodiments, the first device performs the methods involved in the real-time phase whereas the second device performs the methods during the training phase. In other words, the second device trains a machine learning model during the training phase that can provided to the first device to be applied during the real-time phase.

In some embodiments, the system 100 need not include each component/module depicted in FIG. 1. As an example, the system 100 may only include the components/modules that are needed during the real-time phase. In various embodiments, the scene reconstruction module 140 and model training module 145 (depicted in dotted lines in FIG. 1), each of which is only employed during the training phase, need not be included in the system 100 and instead, are included in a third party system. In other words, the third party system can train an appropriate machine learning model that is provided to the system 100 for use during the real-time phase to generate a high resolution depth image. In this embodiment, the system 100 can be in wireless communication with a third party system.

Generally, each of the color sensors 110, the depth sensor 115, and the scene mapping device 120 captures information regarding a scene and provides the captured information to the computing device 150. A scene refers to any particular environmental setting such as an interior room (e.g., office, bedroom, bathroom, dining room, and the like), or any external environment (e.g., natural environment such as beach, mountains, forest, and the like or artificial environments such as streets, buildings, and the like). In other embodiments, a scene can correspond to a particular computer vision problem. For example, if a computer vision problem is concerned with facial recognition, the scene can include one or many individual faces.

Referring to the specific components of the system 100, a color sensor 110 of the system 100 can be configured to capture an intensity of a light of a particular color (e.g., a range of wavelengths corresponding to a color of light). An example of a color sensor 110 is a charge-coupled device (CCD). In various embodiments, the system 100 may include multiple color sensors 110 to capture a wide range of color wavelengths. As depicted in FIG. 1, there may be three color sensors 110 that are configured to capture red, green, and blue (RGB) color light, respectively. As an example, each color sensor 110 may be outfitted or coupled to a filter (e.g., a narrow bandpass filter) that is configured to allow passage of wavelengths of light that correspond to one of the red, green, or blue color light. Therefore, each color sensor 110 captures light of a particular wavelength range that is allowed to pass through a corresponding filter. The three color sensors may be located on a single device of the system 100. For example, the three color sensors 110 depicted in FIG. 1 may be three individual charge coupled devices (CCDs) located within a single camera. Each CCD can have a particular sensitivity or efficiency for capturing light of a wavelength range.

In various embodiments, each color sensor 110 captures a color image at a pre-determined resolution. For example, each color sensor 110 captures a color image at $5k$ (e.g., 5120×2880) resolution. Therefore, an image captured by a color sensor 110 has a width of 5120 pixels and a height of 2880 pixels. However, in other embodiments, other sensor resolutions for a color sensor 110 may be realized. More generally, the width of a color image captured by a color sensor 110 has a width of $W_{input}^C$ and a height of $H_{input}^C$. Therefore, in the embodiment depicted in FIG. 1, the three color sensors 110 captures three color images, e.g., RGB color images that each correspond to an image of the scene. The multiple color images each corresponding to the same image of a scene are hereafter referred to as a set of color images. The color sensors 110 provide their respectively captured color images of the scene to the computing device 150.

A depth sensor 115 may be configured to capture an image with depth information corresponding to a scene. As an example, a depth sensor 115 may include both a projector, such as an infrared (IR) projector, and a camera that detects the emission of the projector, such as an IR camera. In this example, the IR projector emits a pattern of IR light onto objects in the scene. The IR camera detects the distorted pattern of IR light on the objects and determines the depth of each object in the scene based on the density of the pattern of the IR light on the object. As such, the depth sensor 115 captures a depth image with a low resolution. The captured depth image corresponds to an image of the scene and in some embodiments, corresponds to a same image of the scene as a set of color images. In other words, the color sensors 110 and depth sensor are each positioned and configured to capture the same frame of view of a scene. The depth sensor 115 provides the captured depth image of the scene to the computing device 150.

In various embodiments, a depth sensor 115 captures depth images at a resolution that is significantly lower than the resolution of a color image captured by a color sensor 110. In one embodiment, the depth sensor 115 captures depth images with a resolution of 640×480. More generally, an image captured by the depth sensor 115 has a width of $W_{input}^D$ and a height of $H_{input}^D$.

The depth sensor 115 and the color sensors 110 may capture the depth image and color images, respectively, at a particular position in the scene. A position can refer to the location of the depth sensor 115 and color sensors 110 within the scene (e.g., in the middle of the room and the like). Additionally, the position can refer to the six degrees of freedom (e.g., translational and rotational X, Y, and Z-axis) of the depth sensor 115 and color sensors 110 when capturing their respective images.

Generally, at each position, a first color sensor 110 captures a first color image (e.g., red), a second color sensor 110 captures a second color image (e.g., green), a third color sensor 110 captures a third color image (e.g., blue), and the depth sensor 115 captures a depth image. For a particular pixel in each captured image, the first, second, and third color images may each have a unique pixel value—i.e., $R_1$, $G_1$, and $B_1$. Additionally, for the particular location in the captured scene, the depth image may have a corresponding pixel value i.e., $D_1$. Together, the set of pixels corresponding to the particular location can be referred to as $R_1G_1B_1D_1$. However, given that the resolution of the depth image captured by a depth sensor 115 is lower than the resolution of a color image captured by a color sensor 110, the set of pixels corresponding to a second location may be $R_2G_2B_2D_1$. In other words, there may not be a unique pixel from the depth image for each unique RGB color pixel from the first, second, and third color images.

The scene mapping device 120 is an apparatus that captures data from a scene that can be used to generate or obtain high resolution depth information to be used as the ground truth for training the machine learning model. In various embodiments, the scene mapping device 120 can navigate around a scene and gather data at various positions within the scene over that time.

In one embodiment, the scene mapping device 120 is a high resolution depth sensor that captures an image of the scene and timing information corresponding to the captured image. As an example, the high resolution depth sensor can include a light emitter (e.g., an infrared light emitter) as well as a light sensor (e.g., an infrared light sensor). Therefore, the light emitter emits light and the light sensor captures light (e.g., reflected light) from the scene. The high resolution depth sensor captures depth images at resolutions higher than depth images captured by the depth sensor 115. In one embodiment, the high resolution depth sensor captures depth images at a resolution that matches the color images captured by the color sensors 110 (e.g., 5k resolution).

In another embodiment, the scene mapping device 120 may be an instrument that performs light detection and ranging (LIDAR). Therefore, the scene mapping device 120 may include various components including a laser, scanner/optics, and sensors (e.g., LIDAR sensors). The laser can emit light that is in the ultraviolet, visible, or near infrared wavelength ranges in order to capture depth information corresponding to target objects in the scene. The light is reflected off of a target in the scene (e.g., any object or portion of an object that is located some distance away from the scene mapping device 120) and the reflected light is processed through the scanner/optics and captured by a sensor. In one embodiment, the scene mapping device 120 can employ a rotating apparatus (e.g., a mirror) that enables emission of light and capture of reflected light through a full 360 degree horizontal sweep of a scene. In some embodiments, the scene mapping device 120 can be further configured to enable additional capture of reflected light through a full 360 degree vertical sweep of the scene.

In addition to capturing the reflected light, the scene mapping device 120 can also determine time information corresponding to the captured reflected light. For example, the scene mapping device 120 determines the elapsed time between the emission of light (by a light emitter or laser) and subsequent capture of the light by the sensor. The determined elapsed time can be used to determine the distance between the scene mapping device 120 and a target object that the light was reflected off of. For example, a longer elapsed time indicates a farther target object and conversely, a shorter elapsed time indicates a closer target object. The scene mapping device 120 captures data, including both the captured light and corresponding elapsed time information, which can be subsequently used to generate high resolution depth information corresponding to the scene.

In various embodiments, the scene mapping device 120 further determines the corresponding position of the scene mapping device 120 when emitting and/or capturing light from the scene. As one example, the scene mapping device 120 may determine the six degrees of freedom (e.g., translational and rotational X, Y, and Z-axis) of the scene mapping device 120. In some embodiments, the scene mapping device 120 can further include a navigation system (e.g., global positioning system receiver (GPS)) that determines the position of the scene mapping device 120. For example, the navigation system determines the location of the scene mapping device 120 within the scene when capturing light from the scene.

The scene mapping device 120 provides the captured data (e.g., captured light, corresponding timing information, and/or corresponding position of the scene mapping device 120) to the computing device 150. Thereafter, the captured data can be used by the computing device 150 to reconstruct the three-dimensional reconstruction of the scene using reconstruction algorithms such as simultaneous localization and mapping (SLAM).

The computing device 150 also generates a high resolution depth image using a trained depth prediction model. In one embodiment, the model predicts an upsampled depth image from a low resolution depth image captured by the depth sensor 115 and the color images captured by the color sensors 110. In one embodiment, to generate a high resolution depth image, the computing device 150 may include a transformation module 125, a feature extraction module 130, a model application module 135, a scene reconstruction module 140, a model training module 145, as well as a training data store 175. As used herein, the term "module" refers to computer program logic used to provide the specified functionality. The computing device 150 is adapted to execute computer program modules for providing functionality described herein. Thus, a module can be implemented in hardware, firmware, and/or software. In one embodiment, program modules are stored on a storage device of the computing device 150, loaded into a memory of the computing device 150, and executed by a processor of the computing device 150.

The transformation module 125 accounts for the different positions of the color sensors 110, the depth sensor 115, and the scene mapping device 120 in the system 100 that lead to different offsets in the data captured by each respective sensor. For example, the color sensors 110, the depth sensor 115, and the scene mapping device 120 may be positioned at different locations relative to one another. Therefore, color images captured by the color sensors 110, depth images captured by the depth sensor 115, and data captured by the scene mapping device 120 may each be offset relative to one another due to the respective positions of each device/ sensor. As one example, the color sensors 110 and the depth sensor 115 may be located on a same horizontal plane but are several centimeters away from each other.

To account for the offset due to the respective positions of each device/sensor, the transformation module 125 may apply a transformation to images captured by the color sensor 110 and to the images captured by the depth sensor 115. As another example, the transformation module 125 transforms the image from the depth sensor 115 to the coordinate system of the images captured by the color sensors 110 without having to apply a transformation to the images captured by the color sensors 110.

In various embodiments, the relative positions of the color sensors 110 and the depth sensor 115 are fixed. Therefore, the transformations applied by the transformation module 125 are constant. As an example, the transformation may be an affine transformation that maps the coordinates of an image from the depth sensor 115 to the coordinates of an image from one of the color sensors 110. In other embodiments, the relative positions of the color sensors 110 and the depth sensor 115 vary. Therefore, the transformation module 125 can determine an appropriate transformation for each set of depth image and color images depending on the respective positions of the depth sensor 115 and color sensors 110.

Each transformation may consider the effects of various components in the system 100 that may affect the captured images provided to the computing device 150. For example, as described above, the color sensors 110 may be configured with filters (e.g., narrow bandpass filters) that filter particular wavelengths of light. As such, the transformation can take into consideration any effects and/or aberrations in the images captured by the color sensors 110 that arise due to the components of the system 100.

During either the training phase or the real-time phase, the feature extraction module 130 extracts features from color images captured by the color sensors 110 and low resolution depth images captured by the depth sensor 115. Additionally, the feature extraction module 130 may also extract features from a three dimensional map generated by the scene reconstruction module 140. Specifically, the features are variables that are relevant for upsampling the depth images captured by the depth sensor 115. In one embodiment, the features extracted by the feature extraction module 130 can include points, edges, surfaces, or objects identified in each image (e.g., color image or depth image). Here, the feature extraction module 130 may perform an image or object recognition algorithms on the color or depth images in order to identify the edges, surfaces of objects. The extracted features may also include a specific color, intensity of a color, shapes, textures, texts within the images, and the like. In various embodiments, the feature extraction module 130 can generate an ordered list of the features for each image, hereafter referred to as the feature vector for the image. In one embodiment, the feature extraction module 130 applies dimensionality reduction (e.g., via linear discriminant analysis (LDA), principle component analysis (PCA), or the like) to reduce the amount of data in the feature vectors for an image to a smaller, more representative set of data. During the training phase, the feature extraction module 130 can provide a feature vector for each image (e.g., each color image and each depth image) to the model training module 145 to be provided as inputs to train a machine learning model. During the real-time phase, the feature extraction module 130 provides a feature vector for each image to the model application module 135 to be provided as inputs to the trained machine learning model.

In some embodiments, the processes described in reference to the feature extraction module 130 may be performed by the machine learning model itself. As an example, if the machine learning model is a convolutional neural network (CNN), the CNN can extract features from color images captured by the color sensors 110 and low resolution depth images captured by the depth sensor 115. The CNN convolves the pixels of the low resolution depth images or the color images with a patch (e.g., an N×N patch) to identify convolved features. In some embodiments, these identified convolved features can be further pooled and classified to reduce the total number of features in a feature vector.

The scene reconstruction module 140 reconstructs a three dimensional map of a scene given the data captured by the scene mapping device 120 and further generates multiple high-resolution depth images from the reconstructed three dimensional map. For example, each high-resolution depth image generated by the scene reconstruction module 140 corresponds to a position of the depth sensor 115 that captured a corresponding low-resolution depth image. The high-resolution depth image can be used to generate the additional high-resolution depth information that is used as the ground truth data to train the machine learning model.

Referring first to the reconstruction of a three dimensional map, the data captured by the scene mapping device 120 includes captured light, corresponding timing information (e.g., elapsed time between emission and capturing of the light), and corresponding positions of the scene mapping device 120 when capturing the light. In one embodiment, the three dimensional reconstruction process utilizes a simultaneous localization and mapping (SLAM) algorithm. Therefore, the scene reconstruction module 140 generates a three dimensional reconstruction of the scene. To provide an example, the data captured by the scene mapping device 120 may correspond to an indoor room (e.g., a bedroom or an office space). The three dimensional reconstruction includes a full understanding of the indoor room including the geometry of the room.

Given the three dimensional reconstruction, the scene reconstruction module 140 can extract multiple high-resolution depth images from the three dimensional reconstruction. Each high-resolution depth image has a higher resolution than a resolution of a depth image captured by a depth sensor 115. For example, for each high-resolution depth image, the scene reconstruction module 140 identifies a position of the depth sensor 115 within the scene that captured a low-resolution depth image. Given the position, for each pixel in the high-resolution depth image, the scene reconstruction module 140 can trace light rays from that position using the three dimensional reconstruction to determine the depth value of that pixel. For example, for each pixel, the depth value of the pixel can correspond to an object in the three dimensional reconstruction nearest to the position of the depth sensor 115.

In various embodiments, the scene reconstruction module 140 the three dimensional reconstruction of the scene additionally includes color information. Therefore, the scene reconstruction module 140 can also extract multiple higher-resolution color images (e.g., higher resolution than color images captured by color sensors 110), each higher-resolution color image corresponding to a position of the color sensors 110 within the scene. For each pixel in each higher-resolution color image, the scene reconstruction module 140 traces light rays from the position of the color sensors 110 using the three dimensional reconstruction and determines a color of a corresponding object in the three-dimensional reconstruction. In various embodiments, the scene reconstruction module 140 can further apply desired virtual camera parameters to the ray tracing process such that the ground truth data derived from higher-resolution color images can be used to train a machine learning model to generate additional color images that are transformed from the color images captured by the color sensors 110.

In another embodiment, the scene reconstruction module 140 receives multiple higher-resolution color images instead of extracting them from a three dimensional reconstruction. For example, the higher-resolution color images may be captured by color sensors that capture color images at a higher resolution that the previously described color sensors 110.

The model training module 145 trains one or more machine learning models using training data obtained from the training data store 175. Training data includes high resolution color information derived from color images captured by the color sensors 110, low resolution depth information derived from a depth image captured by the depth sensor 115, and additional high resolution depth information derived from captured by the scene mapping device 120. More specifically, the one or more machine learning models are each iteratively trained using the high resolution color information and low resolution depth information as inputs, and the additional high resolution depth information as the ground truth. In various embodiments, at each iteration, each of the high resolution color information, low resolution depth information, and additional high resolution depth information form a training example that corresponds to a same field of view of the scene. A trained machine learning model can be stored in the training data store 175 for subsequent retrieval and application during the real-time phase.

In the real-time phase, the model application module 135 retrieves a trained machine learning model from the training data store 175 and applies the trained machine learning model to a low resolution depth image captured by the depth sensor 115 and color images captured by the color sensors 110. The trained machine learning model then outputs an upsampled depth image. The application of a trained machine learning model is described further below in reference to FIG. 2.

Machine Learning Model

In various embodiments, the model training module 145 trains a machine learning model. In various embodiments, the machine learning model is one of a decision tree, an ensemble (e.g., bagging, boosting, random forest), linear regression, Naïve Bayes, neural network, or logistic regression.

In various embodiments, the machine learning model receives, as inputs, color information and low resolution depth information. In one embodiment, the color information and low resolution depth information are feature vectors that includes features extracted from color images and low resolution depth images, respectively. The color information is derived from a set of color images which are each captured by the color sensors 110. Additionally, the low resolution depth information is derived from a low resolution depth image captured by the depth sensor 115. Each of the color images and depth image correspond to the same frame of view of the scene.

With these inputs, the machine learning model generates and outputs upsampled depth information. In one embodiment, the upsampled depth information is a feature vector corresponding to an upsampled depth image, hereafter referred to as the upsampled depth feature vector. In another embodiment, the outputted upsampled depth information is an upsampled depth image. The upsampled depth image can be predicted from the upsampled depth feature vector.

Referring to the inputs of the machine learning model, in various embodiments, each of the feature vectors that correspond to one of the color images, hereafter referred to as color feature vectors, includes more extracted features in comparison to the feature vector corresponding to the low resolution depth image, hereafter referred to as a depth feature vector. This is due to the higher resolution of the color images in comparison to the low resolution of the depth image. In one embodiment, to generate an upsampled depth feature vector, the machine learning model can compare the extracted features in the depth feature vector to the extracted features in each of the color feature vectors.

In some embodiments, the machine learning model receives only the low resolution depth information as input, without receiving additional color information. Therefore, the machine learning model generates upsampled depth information from low resolution depth information without considering color information.

In another embodiment, the machine learning model receives both the low resolution depth information and color information as inputs and outputs altered color information in addition to upsampled depth information. In one scenario, the machine learning model can generate higher resolution color information (e.g., higher resolution than the initial resolution of the color images captured by the color sensors 110). In another scenario, the altered color information includes altered color images that have the same resolution in comparison to the color images captured by the color sensors 110. However, the altered color images may be predicted by the machine learning model such that the altered color images and the upsampled depth image outputted by the machine learning model are aligned. As an example, the edges and/or surfaces of a common object in the altered color images and the upsampled depth image predicted by the machine learning model are aligned. This may be beneficial for subsequent applications that use both the upsampled depth image and altered color images.

Training Phase

The model training module 145 trains a machine learning model during the training phase based on the data captured by the color sensors 110, the depth sensor 115, and the scene mapping device 120. Different machine learning techniques can be used to train the machine learning model including, but not limited to decision tree learning, association rule learning, artificial neural network learning, deep learning, support vector machines (SVM), cluster analysis, Bayesian algorithms, regression algorithms, instance-based algorithms, and regularization algorithms.

The model training module 145 provides training data including color information and low resolution depth information as input to the training model. The color information is derived from a set of color images whereas the low resolution depth information is derived from a depth image. Each of the set of color images and depth image are captured from the same field of view of the scene. In some embodiments, the color information and low resolution depth information is in the form of feature vectors for each of the color images and the low resolution depth images. Therefore, the model training module 145 provides the feature vectors as input to the machine learning model. In some embodiments, the received feature vectors may derive from color images and low resolution depth images that have undergone a transformation process to eliminate positional offsets, as described previously in reference to the transformation module 125. In another embodiment, the color information and low resolution depth information provided as input to the machine learning model are the images themselves e.g., color images captured by the color sensors 110 and low resolution depth images captured by the depth sensor 115. In this scenario, the machine learning model performs the feature extraction. Given the input feature vectors of the color images and depth image, the machine learning model generates an output, which, in some embodiments is an upsampled depth image.

To train the machine learning model, the model training module 145 first identifies a training example that includes the appropriate ground truth data that is to be used to train the model. More specifically, for a low resolution depth information and color information in a training example, the model training module 145 determines the position of the depth sensor 115 and color sensors 110 that captured the depth image and color images corresponding to the low resolution depth information and color information, respectively. The model training module 145 identifies the ground truth data (e.g., depth information derived from a high resolution depth image) generated by the scene reconstruction module 140 that corresponds to the same position of the depth sensor 115 and color sensors. Therefore, the model training module 145 identifies a training example that includes the depth image, color images, and appropriate ground truth data.

In some embodiments, the appropriate ground truth data includes depth and color information derived from a high-resolution depth image and multiple high-resolution color images, respectively. The high-resolution depth image and multiple high-resolution color images may both be generated by the scene reconstruction module 140.

After identifying the appropriate ground truth data, the model training module 145 trains the machine learning model to minimize an error between the output of the machine learning model and the ground truth data. In one embodiment, the output of the machine learning model is the upsampled depth feature vector. Therefore, the error is determined based on a comparison between the upsampled depth feature vector and a feature vector including extracted features from the three dimensional reconstruction data. In another embodiment, the output of the machine learning model is the upsampled depth image predicted from the upsampled depth feature vector. Therefore, the error is determined based on a comparison between the upsampled depth image and data of the three dimensional map that corresponds to the same field of view. Such an error may be determined based on a pixel-by-pixel comparison between the upsampled depth image and data of the three dimensional map.

In various embodiments, the model training module 145 backpropagates the error such that the parameters of the machine learning model are tuned to minimize the error. As one example, the parameters of the machine learning model are tuned to improve the generation of an upsampled depth feature vector. As another example, the parameters of the machine learning model can be tuned to better predict an upsampled depth image from an upsampled depth feature vector. Specifically, the assigned weight to each feature in the upsampled depth feature vector can be tuned to minimize the error. In one embodiment, the machine learning model is a fully convoluted neural network and therefore, the model training module 145 minimizes the error by tuning an N×N learned patch. Therefore, the machine learning model can identify and extract features from the color images and low resolution depth image using the N×N patch. The extracted features can be used by the machine learning model to generate an output with reduced error. As one example, the model training module 145 uses gradient descent to train the model.

In various embodiments, during the training phase, the model training module 145 trains multiple machine learning models. Each machine learning model may be specific for a particular scene domain, such as an indoor environment (e.g., office, bedroom), outdoor natural environment (e.g., roads, mountain trails, lake, beach, and the like), non-natural setting (e.g., metropolitan city), a particular computer problem (e.g., vision problem). The training data thus corresponds to a particular scene domain from which the training data was captured. Therefore, the model training module 145 retrieves training data that was captured from a training scene and identifies a scene domain corresponding to the training scene. As an example, the model training module 145 can identify a scene domain by applying image recognition algorithms on the training data and identifying objects that are unique to a domain (e.g., trees in an outdoor scene, walls in an indoor scene). The model training module 145 retrieves and trains the appropriate machine learning model that is specific for the identified scene domain using the training data. In other embodiments, the model training module 145 may train a general machine learning model irrespective of the scene domain.

The model training module 145 can store the trained machine learning model in the training data store 175. When the machine learning model is needed, such as during the real-time phase, the model application module 135 can retrieve and apply the appropriate trained machine learning model.

Real-Time Phase

Figure 2:
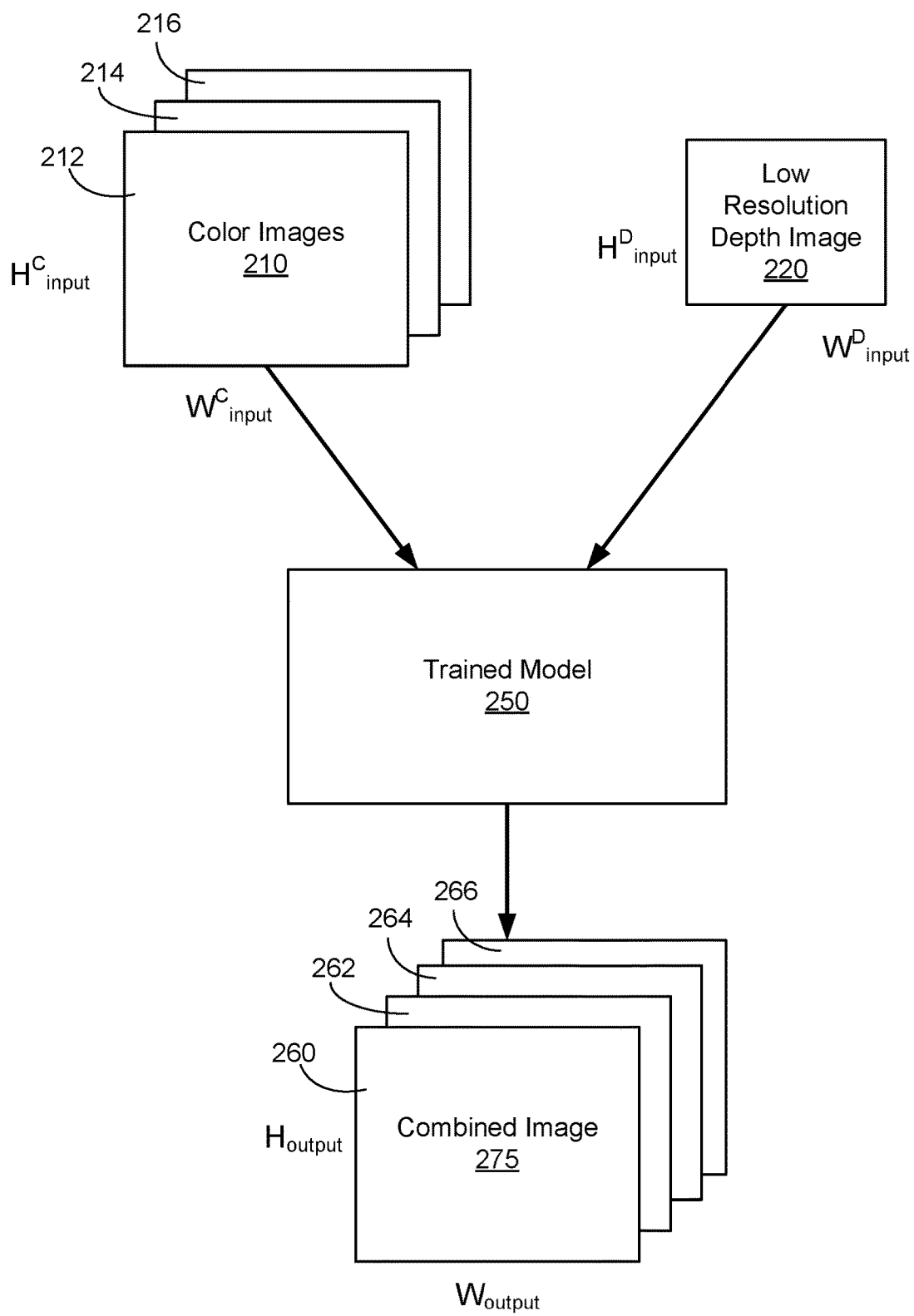
FIG. 2 is an example block diagram process depicting the application of a trained machine learning model, in accordance with an embodiment.

FIG. 2 is an example block diagram process 200 depicting the application of a trained machine learning model, in accordance with an embodiment. More specifically, FIG. 2 depicts a process performed by the model application module 135 of the computing device 150 during a real-time phase. In some embodiments, the model application module 135 identifies a scene domain corresponding to the color images 210 and low resolution depth image 220 and retrieves an appropriate trained model 250 from the training data store 175. The retrieved trained model 250 may have been previously trained for a particular scene domain. For example, to identify the appropriate trained model 250, the model application module 135 can match the scene domain of the color images 210 and low resolution depth image 220 to a scene domain of the appropriate trained model 250.

In various embodiments, the model application module 135 applies the trained model 250 to color images 210. Namely, as shown in FIG. 2, a first color image 212, a second color image 214, and a third color image 216 are provided as inputs to the trained model 250. Together, the three color images 210 may be the RGB color images. In other embodiments, more or less color images 210 may be provided as input to the trained model 250. Each color image 212, 214, and 216 may have input dimensionality of height $H_{input}^C$ and width $W_{input}^C$. In various embodiments, each color image has the same dimensionality as other color images 210. As one example, the dimensionality of a color image may be 5120×2880 pixels. In other embodiments, the color image dimensionality of each of the color images 212, 214, and 216 differ from one another.

Additionally, the model application module 135 applies the trained model 250 to a low resolution depth image 220. The depth image has dimensionality of height $H_{input}^D$ and width $W_{input}^D$. In some embodiments, the dimensionality of the depth image is 640×480 pixels. Generally, the resolution of the low resolution depth image 220 is smaller than the resolution of a color image 210 (e.g., $H_{input}^C > H_{input}^D$ and width $W_{input}^C > W_{input}^D$). The color images 210 and the low resolution depth image 220 each correspond to a field of view of the scene.

The trained model 250 outputs a combined image 275 that, as depicted in FIG. 2, includes four image channels. As an example, the four image channels may be a red color image 260, a green color image 262, a blue color image 264, and an upsampled depth image 266.

In various embodiments, each image channel in the combined image 275 has the same dimensionality. For example, FIG. 2 depicts that each image in the combined image 275 has a dimensionality of height $H_{output}$ and width $W_{output}$. In some embodiments, the dimensionality of each image in the combined image 275 matches the original dimensions of the color images 210. In other words, $H_{output} = H_{input}^C$ and $W_{output} = W_{input}^C$. In other embodiments, the dimensionality of the combined image 275 may be different than the dimensionalities of the color images 210.

Generally, the depth image 266 of the combined image 275 has a greater resolution than the low resolution depth image 220 (e.g., $H_{output} > H_{input}^D$ and $W_{output} > W_{input}^D$). Therefore, for each RGB pixel that derives from each of the red 260, green 262, and blue 264 color images, there is a unique and corresponding depth pixel from the depth 266 image. A set of pixels from the combined image 275 may be expressed as $R_N G_N B_N D_N$ where N is the Nth pixel in an image of the combined image 275.

Although the application of the trained model 250 shown in FIG. 2 applies to both color images 210 and a low resolution depth image 220, in some embodiments, a low resolution depth image 220 is provided as input to the trained model 250 without the color images 210 and the trained model 250 correspondingly outputs an upsampled depth image 266 with higher dimensionalities (e.g., resolution).

In various embodiments, the machine learning model may further output altered versions of the color images as well. For example, three color images (e.g., RGB color images) may be provided as input to the trained machine learning model, which then outputs three or more color images each having a higher resolution in comparison to an initial resolution of the color images that were captured by the color sensors 110. Therefore, the output of the trained machine learning model (e.g., upsampled depth image and altered color images) may have different height and width dimensionalities in comparison to the low resolution depth image and color images that were each provided as input into the trained machine learning model.

Figure 3:
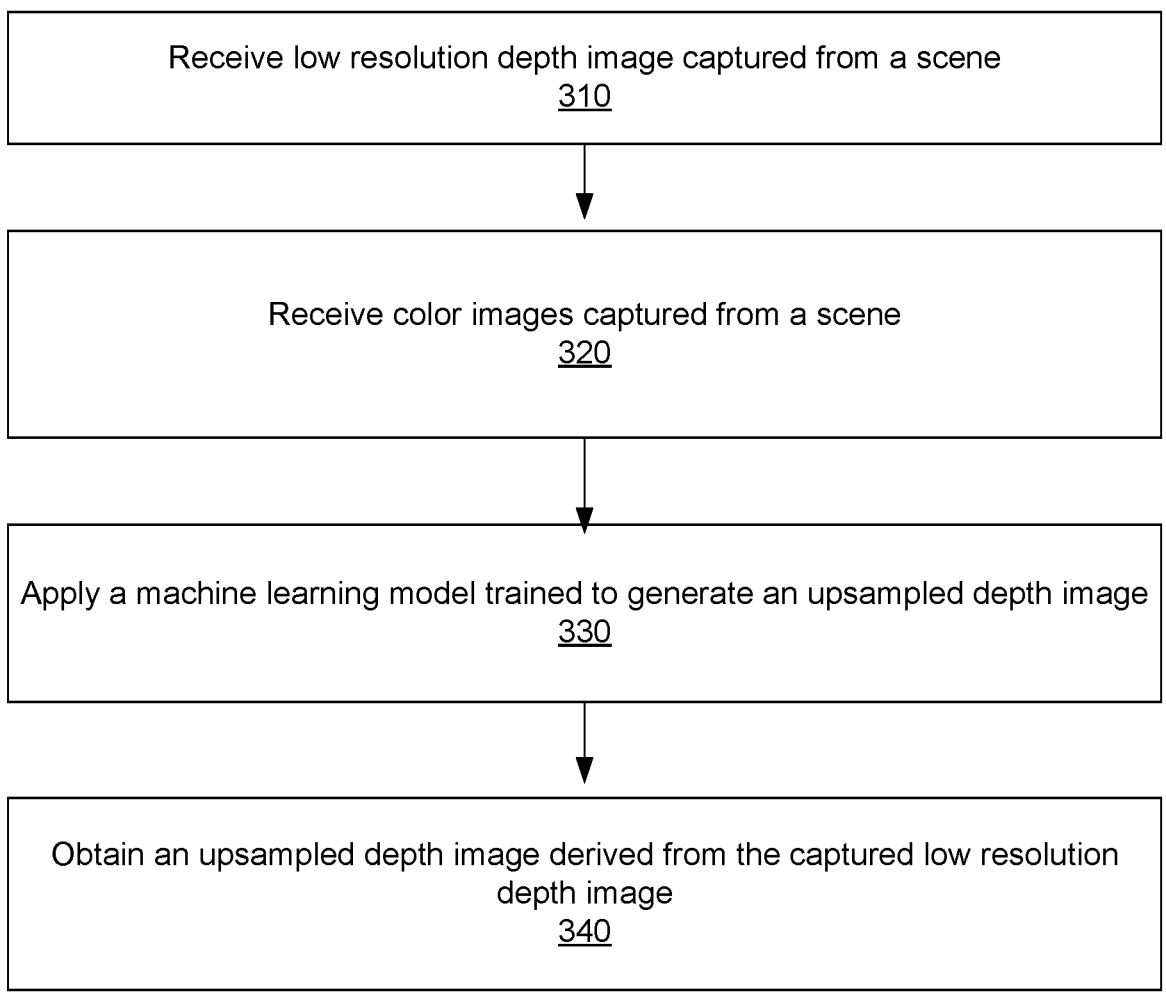
FIG. 3 is a flow process for increasing the resolution of a depth image, in accordance with an embodiment.

FIG. 3 is a flow process of increasing the resolution of a depth image, in accordance with an embodiment. The system 100 receives 310 a low resolution depth image captured from a scene using a depth sensor 115. In various embodiments, the resolution of the low resolution depth image may be limited to 640×480 pixels. Additionally or alternatively, the system 100 receives 320 color images captured by the multiple color sensors 110 of the system 100 from a scene. In one embodiment, the color sensors 110 and the depth sensor 115 may be positioned at different locations relative to one another and therefore, the captured low resolution depth image may be offset from the captured color images. As such, the system 100 transforms one or both of the low resolution depth image and the multiple color images to eliminate the offset.

The system 100 applies 330 a machine learning model that is trained to generate an upsampled depth image. The low resolution depth image and the color images are provided as input to the machine learning model. The system 100 obtains 340 an upsampled depth image derived from the captured low resolution depth image as output from the machine learning model. In some embodiments, the machine learning model is trained to generate altered color images and as such, the system 100 obtains altered color images in addition to the upsampled depth image. In various scenarios, the upsampled depth image has a resolution that matches the resolution of the color images that were captured by the color sensors 110 of the system 100.

GENERAL

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving a low resolution depth image captured from a scene, the low resolution depth image captured at an initial resolution;
receiving one or more color images captured from the scene;
selecting, based on an object identified in the scene, a machine learning model corresponding to a scene domain for the one or more color images;
applying the machine learning model to the low resolution depth image and the one or more color images,
wherein the machine learning model is trained using an input depth image captured by a depth sensor, input color information derived from a set of color images, and known depth information, and
wherein the machine learning model is trained to generate a high-resolution depth image from the low-resolution depth image and the one or more color images; and
obtaining from the model an upsampled depth image having an upsampled resolution higher than the initial resolution of the low resolution depth image.

2. The method of claim 1, wherein applying the machine learning model comprises extracting features from the one or more color images and from the low resolution depth image, and providing the extracted features as inputs to the machine learning model.

3. The method of claim 1, wherein the machine learning model is trained on ground truth values comprising depth information derived from a three dimensional reconstruction of a training scene.

4. The method of claim 1, wherein the upsampled resolution of the upsampled depth image matches a resolution of the one or more color images captured from the scene.

5. The method of claim 1, wherein the machine learning model is further trained to generate one or more altered color images each having a resolution that is equal to or greater than a resolution of the received one or more color images.

6. The method of claim 1, wherein applying the machine learning model comprises:
selecting the machine learning model from a plurality of machine learning models, where the selected machine learning model is selected based on having been trained on training data captured from a training scene corresponding to the identified scene domain.

7. The method of claim 1, further comprising:
transforming at least one of the received low resolution depth image and the received one or more color images to align together based on relative positions of sensors that captured each of the low resolution depth image and the one or more color images.

8. A non-transitory computer readable medium comprising computer code that, when executed by a processor of a computer, causes the processor to:
receive a low resolution depth image captured from a scene, the low resolution depth image captured at an initial resolution;
receive one or more color images captured from the scene;
select, based on an object identified in the scene, a machine learning model corresponding to a scene domain for the one or more color images;
apply the machine learning model to the low resolution depth image and the one or more color images,
wherein the machine learning model is trained using an input depth image captured by a depth sensor, input color information derived from a set of color images, and known depth information, and
wherein the machine learning model is trained to generate a high-resolution depth image from the low-resolution depth image and the one or more color images; and
obtain from the model an upsampled depth image having an upsampled resolution higher than the initial resolution of the low resolution depth image.

9. The non-transitory computer readable medium of claim 8, wherein the computer code to apply the machine learning model further comprises computer code that when executed by the processor causes the processor to extract features from the one or more color images and from the low resolution depth image, and provide the extracted features as inputs to the machine learning model.

10. The non-transitory computer readable medium of claim 8, wherein the machine learning model is trained on ground truth values comprising depth information derived from a three dimensional reconstruction of a training scene.

11. The non-transitory computer readable medium of claim 8, wherein the upsampled resolution of the upsampled depth image matches a resolution of the one or more color images captured from the scene.

12. The non-transitory computer readable medium of claim 8, further comprising computer code that, when executed by a processor of a computer, causes the processor to:
obtain one or more altered color images each having a resolution that is equal to or greater than a resolution of the received one or more color images.

13. The non-transitory computer readable medium of claim 8, where the computer code to apply the machine learning model further comprises computer code that when executed by the processor causes the processor to:
select the machine learning model from a plurality of machine learning models, where the selected machine learning model is selected based on having been trained on training data captured from a training scene corresponding to the identified scene domain.

14. A method comprising:
generating a plurality of examples for a training data set, where generating each example in the training data set comprises:
receiving a low-resolution depth image and one or more color images captured from a scene, where the low resolution depth image and the one or more color images were captured from a camera position in the scene,
receiving three dimensional data captured that describes the scene,
generating a three-dimensional reconstruction of the scene based on the three dimensional data, and
generating a high-resolution depth image of the scene from the camera position based on the three-dimensional reconstruction of the scene, the high-resolution depth image having a higher resolution than the low-resolution depth image;

selecting, based on an object identified in the scene, a machine learning model corresponding to a scene domain; and training the machine learning model using the training data set, where, for each example in the training data set, the inputs to the machine learning model comprise features extracted from the received low-resolution depth image and features extracted from the received one or more color images, and where the outputs of the machine learning model comprise the generated high-resolution depth image.

15. The method of claim 14, wherein training the machine learning model comprises, iteratively, for at least a plurality of the example of the training data set:

determining an error between an upsampled depth image generated by the machine learning model for the inputs of the example and the high resolution depth information of the example; and tuning one or more parameters of the machine learning model to reduce the determined error.

16. The method of claim 14, wherein the plurality of examples are selected from the training data set based on being captured from a particular scene domain.

17. The method of claim 14, wherein the three dimensional data is captured by light detection and ranging (LIDAR) sensors, and wherein generating the three dimensional reconstruction comprises processing the three dimensional data using simultaneous localization and mapping (SLAM) algorithms.

18. The method of claim 14, wherein generating the high-resolution depth image of the scene from the camera position comprises:

for each pixel of the high-resolution depth image, determining a depth from the camera position to a nearest object in the three dimensional reconstruction of the scene.

19. The method of claim 14, wherein the outputs of the machine learning model further comprise one or more upsampled color images that each has a resolution that is greater than a resolution of the one or more color images captured from a scene, where the machine learned model is further trained based on high-resolution color images of the scene from the camera position generated based on the three-dimensional reconstruction of the scene.

20. The method of claim 19, wherein generating the high-resolution color images of the scene from the camera position comprises:

for each pixel of the high-resolution color images, determining a color from the camera position of a corresponding object in the three-dimensional reconstruction of the scene.

* * * * *